(12) United States Patent
Benner et al.

(10) Patent No.: US 8,336,835 B1
(45) Date of Patent: Dec. 25, 2012

(54) SUPPORT DEVICE AND METHOD OF USE

(76) Inventors: Korey Benner, Fall Creek, WI (US);
Tim Smith, Fall Creek, WI (US);
Adrian Luther, Eau Claire, WI (US)

( * ) Notice: Subject to any disclaimer, the term of this patent is extended or adjusted under 35 U.S.C. 154(b) by 0 days.

(21) Appl. No.: 12/650,691

(22) Filed: Dec. 31, 2009

(51) Int. Cl.
*F16M 11/00* (2006.01)

(52) U.S. Cl. ................ 248/200.1; 248/188.5; 248/354.1

(58) Field of Classification Search ............... 248/200.1, 248/351, 354.1, 354.3, 354.4, 354.6, 354.7, 248/357, 188.5
See application file for complete search history.

(56) References Cited

U.S. PATENT DOCUMENTS

| | | | |
|---|---|---|---|
| 3,712,652 A * | 1/1973 | Uilkema | 403/108 |
| 4,761,092 A | 8/1988 | Nakatani | |
| 4,928,916 A | 5/1990 | Molloy | |
| 5,640,826 A | 6/1997 | Hurilla, Jr. | |
| 5,746,152 A * | 5/1998 | Huse | 114/363 |
| 5,979,854 A | 11/1999 | Lundgren et al. | |
| 6,042,066 A | 3/2000 | Maharg et al. | |
| 6,467,741 B1 * | 10/2002 | Shih | 248/200.1 |
| 6,575,100 B2 | 6/2003 | Faucher et al. | |
| 6,702,482 B2 | 3/2004 | Sherwin | |
| 6,913,231 B2 | 7/2005 | Speggiorin | |
| 2004/0101351 A1 * | 5/2004 | Pitcher | 403/109.5 |
| 2006/0062632 A1 * | 3/2006 | Jang | 403/109.6 |
| 2009/0152431 A1 * | 6/2009 | Melic | 248/354.1 |

* cited by examiner

*Primary Examiner* — Ramon Ramirez
(74) *Attorney, Agent, or Firm* — Anthony J. Bourget (57) ABSTRACT

A support pole comprising an outer upper pole and an inner lower pole. The inner pole may telescopically slide within the upper pole. The poles may slide freely with respect to one another. A lock mechanism with a quick-release lever may be utilized to friction or tension lock the first pole at a desired position with respect to the second pole. The support pole may be used in a variety of methods including dry wall support.

24 Claims, 6 Drawing Sheets

SUPPORT DEVICE AND METHOD OF USE

BACKGROUND OF THE INVENTION

1. Field of the Invention

This invention is generally directed to supports, and more particularly, directed to expandable supports.

2. Background Information

Support poles are known and are often called tension poles. Support poles may be used for a variety of purposes including supporting a ceiling a specified distance from a floor. Support poles may be effective as temporary or permanent means of support.

Support poles generally have at least a first pole that telescopes with a second pole. The first and second poles may expand and be locked in place by an adjusting system such as a pin-lock system or a threaded-lock system. The known adjusting systems generally require two hands to, first, place the first and second poles in an unlocked position and, second, to lengthen or shorten the combined length of the telescoping first and second poles.

SUMMARY OF THE INVENTION

Support poles are well known to assist in supporting various objects. The inventor has realized certain deficiencies of the existing support poles and has developed a novel device that allows for efficient and precise adjustment of telescoping poles.

Generally, an embodiment of the invention includes a first pole having a first diameter that telescopically engages a second pole having a second diameter. The first diameter may be larger than a second diameter to facilitate the telescopic engagement of the poles. The telescoping poles may be locked into place with one another with a quick-release lock mechanism.

The quick release lock mechanism may include at least a lever, a spring mechanism, a lever holder, a screw, and a footer. The lever, spring mechanism and lever holder may be located outside of both the first and second poles. The footer may be located inside the first and second poles and may directly abut the inside of the second pole, at least when in a resting position. The screw may be utilized to connect the spring mechanism, lever and lever holder to the footer through holes in the poles.

The second pole may have an elongated hole for interacting with the screw and the first pole may have a screw hole that allows the screw to pass through without substantial friction. Due to the elongated hole of the second pole and the adjustment mechanism, the second pole is able to be slidably adjusted with respect to the first pole without the possibility of the first and second pole disengaging.

The lock mechanism is attached to the first and second poles via the screw interacting with the footer. The footer, having a threaded, screw receiving hole, may be placed inside the second pole and the screw receiving hole may be aligned with the elongated hole and the screw hole of the first pole. Then the lever holder, having a second screw hole, may be placed along the outer diameter of the first pole so as to the align the second screw hole with the screw hole in the first pole, the elongated hole, and the screw receiving hole. Then the spring mechanism may be placed on top of the aligned holes, adjacent the second screw hole, and a screw may be inserted through a diameter of the spring mechanism and through the holes. The screw may threadably engage the screw receiving hole in the footer. Next the lever may be attached to the lever holder. Any logical order of attachment may be utilized.

An object of the invention is to provide a quick-release lock mechanism that interacts with telescoping poles in a manner that when a lever of the adjustment mechanism is in a natural, resting position, the adjustment mechanism may maintain the position of the first pole with respect to the second pole.

An object of the invention is to provide a support pole having a length that may be easily adjusted on-the-fly by pressing a lever, without undue force, to adjust the length and then releasing the lever to lock the support poles at a desired length.

Another object of the invention is to provide a method of using a quick release support pole to support a first object a specific distance from a second object without using more than one hand to release a telescoping pole.

The above summary of the present invention is not intended to describe each illustrated embodiment, aspect, or every implementation of the present invention. The figures and detailed description that follow more particularly exemplify these and other embodiments and further aspects of the invention. Other features and advantages of the invention will be apparent from the following description, the accompanying drawings and the appended claims.

BRIEF DESCRIPTION OF THE DRAWINGS

The invention may be more completely understood in consideration of the following description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments described. The intention is to cover preferred embodiments, modifications, equivalents, and alternatives falling within the spirit and scope of the invention and as defined by the appended claims.

DETAILED DESCRIPTION OF THE DRAWINGS

The subject inventive support apparatus and methods of using the support apparatus may take on numerous physical and methodical embodiments within the spirit of the invention and only preferred embodiments have been described in detail below, which are not meant to limit the scope and/or spirit of the invention.

As shown in the figures quick-release support pole 10 is made up of at least first pole 30, second pole 40 and lock mechanism 100. In addition to its main components that make it an adjustable support pole, quick release support pole 10 may include an upper support 20 and a lower support 50 and other features.

Figure 1:
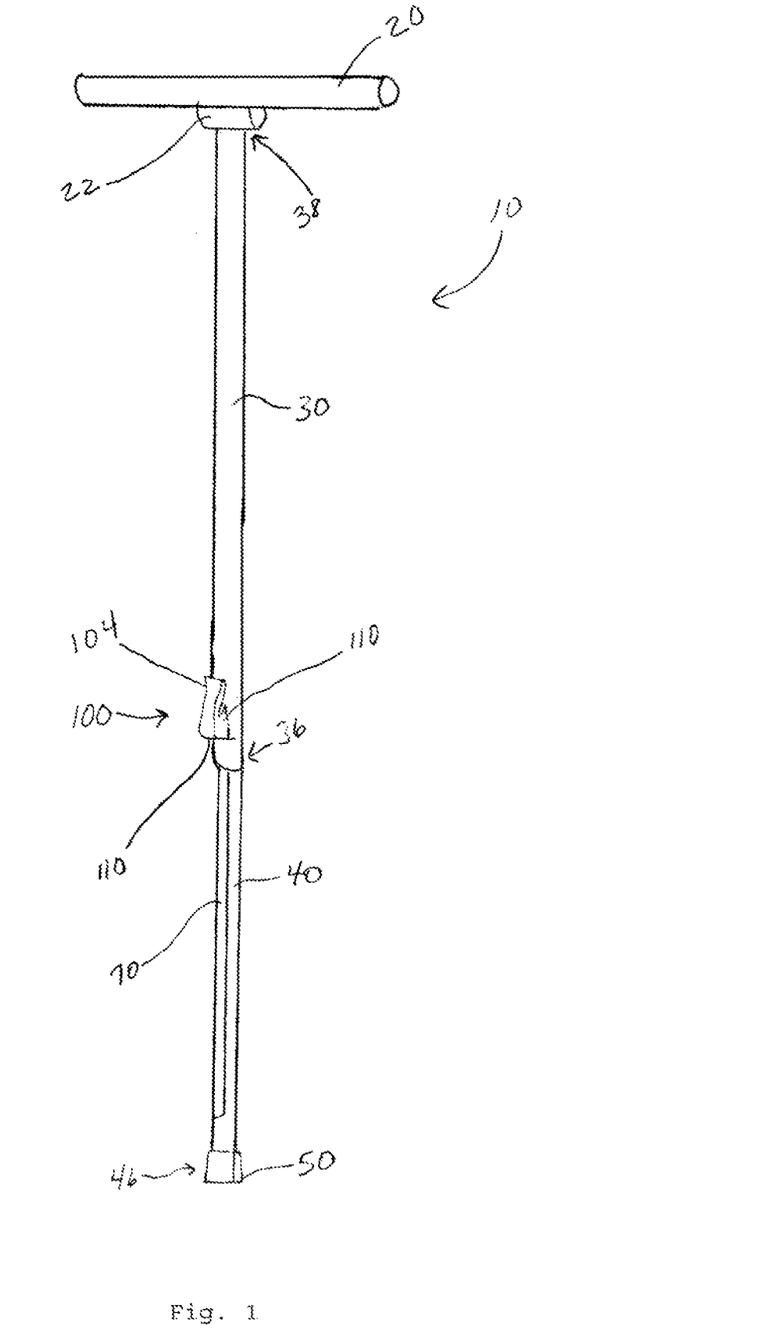
FIG. 1 is a perspective view of an embodiment of the invention.
Figure 2:
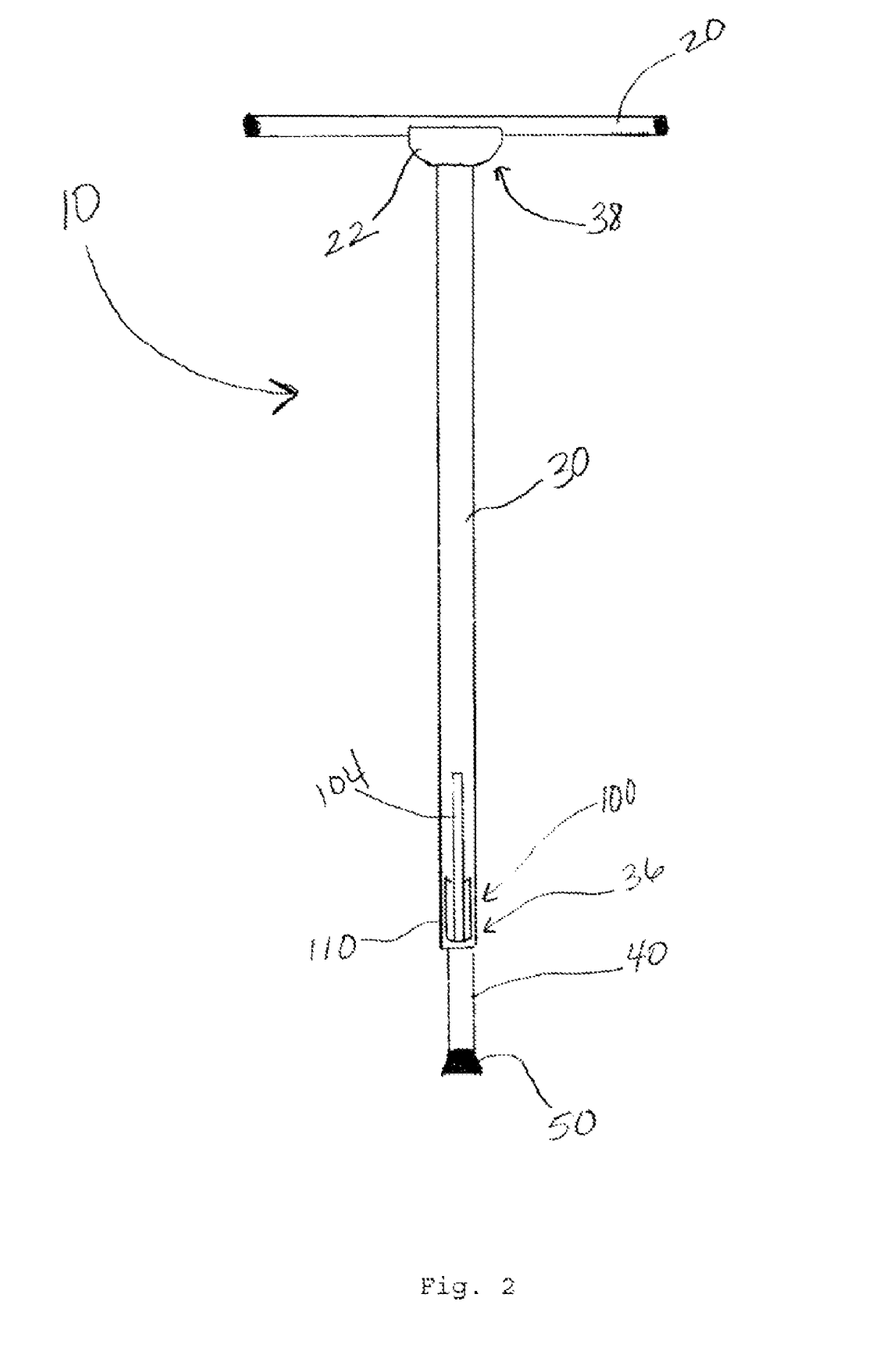
FIG. 2 is a front plan view of FIG. 1.
Figure 3:
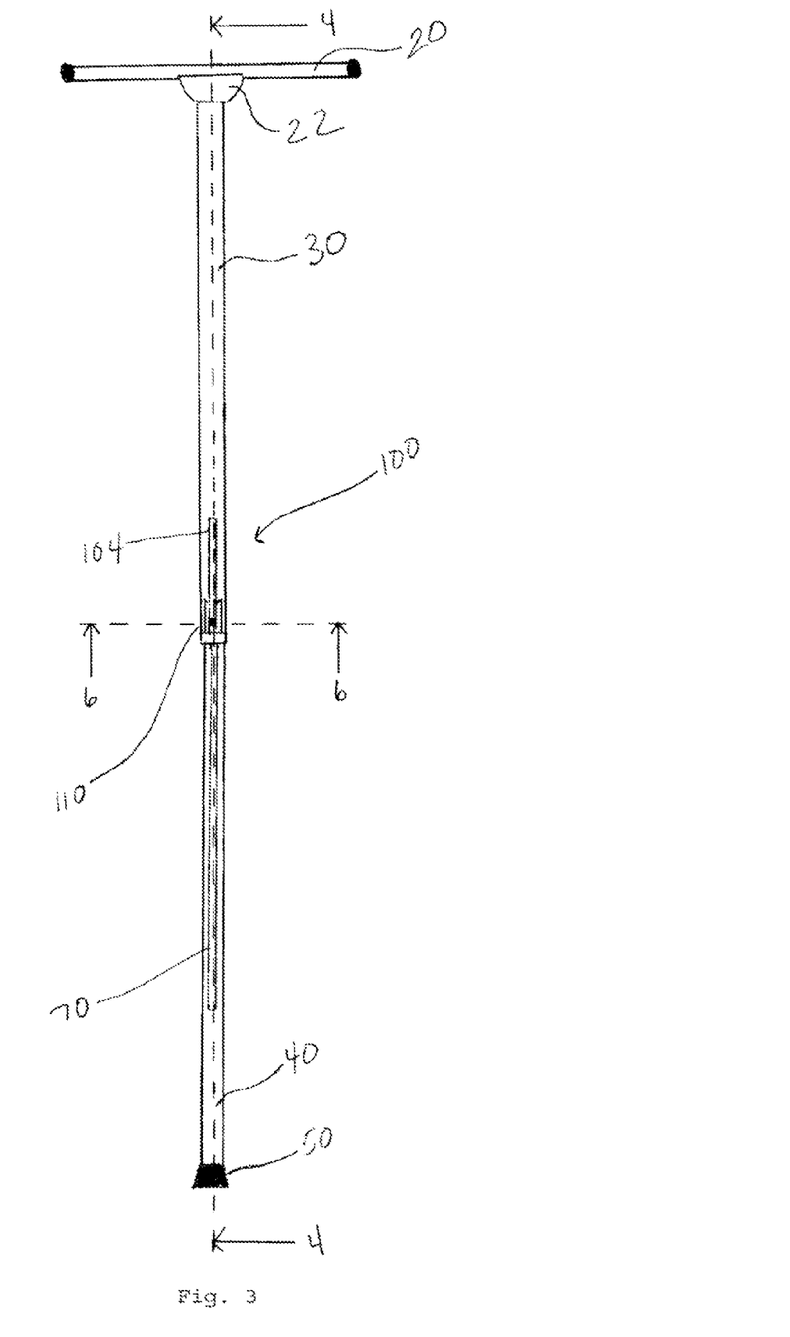
FIG. 3 is a front plan view of the embodiment of FIG. 1 expanded.
Figure 4:
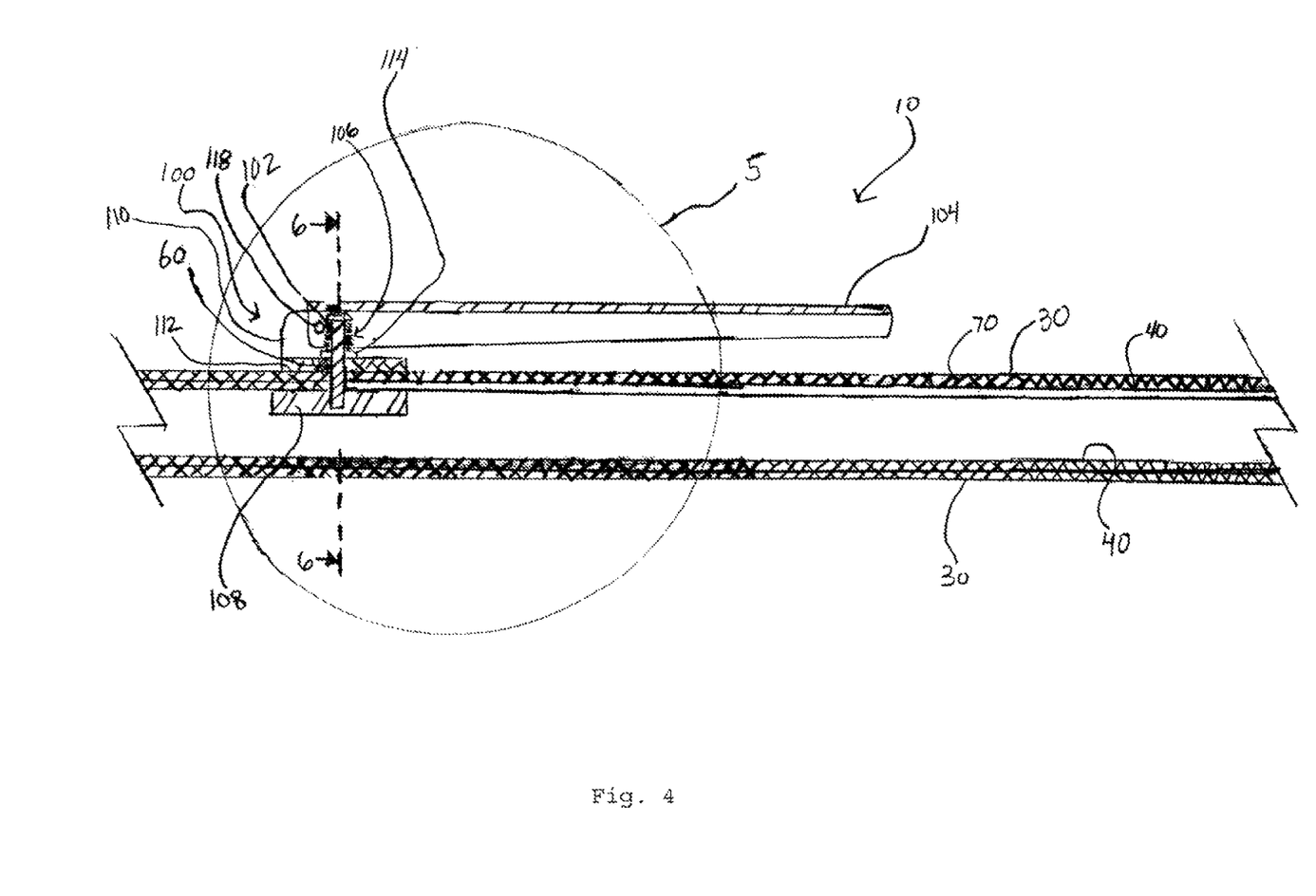
FIG. 4 is a partial cross-section of the embodiment taken across line 4-4 of FIG. 3.

FIGS. 1-3 disclose upper support 20 attached to second end 38 of first pole 30. Upper support 20 may take on any shape; for example, a solid or hollow tube or a web having a large area or a suction cup or other similar structure known for support objects. Upper support 20 may be attached to second end 38 of first pole 30 by an upper support connector 22. Upper support connector 22 may be any connection means that allows upper support 20 to be adjustable with respect to first pole 30. For example, such a connection means may be brackets and welding or welding or brackets and pins or pins or a ball and socket or any combination thereof or other similar connector. It may be advantageous to rotationally attach upper support 20 to first pole 30. For example, upper support 20 may be able to tilt at up to fifteen (15) degrees or more with respect to the horizontal perpendicular to a central axis of first pole 30 or rotate three-hundred sixty (360) degrees about the central axis, or a combination thereof. In the event upper support 20 is rotationally or movably attached to first pole 30, it may be advantageous to provide a mechanism to lock upper support 20 in place with respect to first pole 30. Such a lock may be a snap lock or any other type of lock.

As seen in FIGS. 2 and 3, a first end 36 of first pole 30 may telescopically engage a second end of second pole 40. Poles 30, 40 may be substantially round or any other shape, including but not limited to rectangular or square tubes. Preferably each pole is rounded and has a two-dimensional torus shaped cross-section with two circumferences, an inner circumference (or inner surface) and an outer circumference (or outer surface). Further, poles 30, 40 may be made from any material and it is advantageous to use strong and light materials (e.g., an aluminum).

Figure 5:
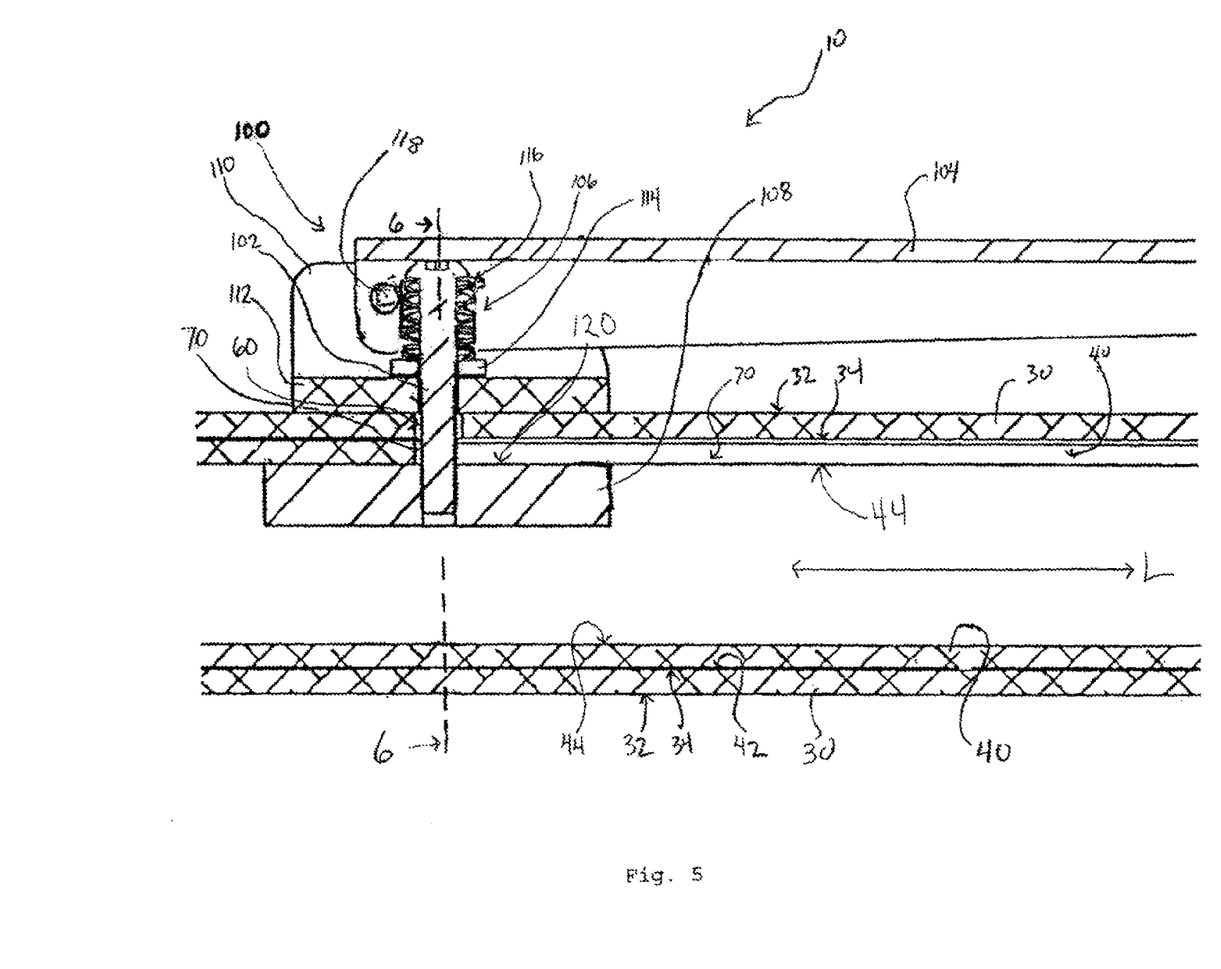
FIG. 5 is a close-up of FIG. 4 taken along circle 5.
Figure 6:
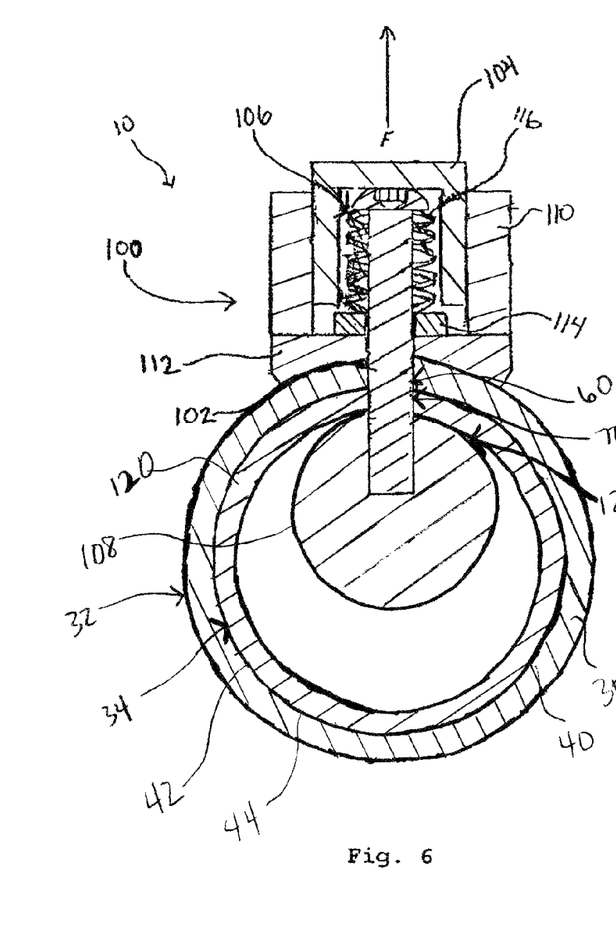
FIG. 6 is a cross-section of the embodiment taken across line 6-6 of FIG. 3.

FIGS. 5 and 6 show first pole 30 having a first outer circumference 32 and a first inner circumference 34 and second pole 40 having a second outer circumference 42 and a second inner circumference 44. First inner circumference 34 may be slightly larger than second outer circumference 42, but the circumferences may be substantially the same size. For example, second pole 40 should be able to slide within first pole 30.

In addition to slidably engaging first pole 30 with second pole 40, poles 30, 40 may connect to one another via a clutch or lock mechanism 100, as shown in FIGS. 4-7. Lock mechanism 100 engages first pole 30 and second pole 40 through first hole 60 and second hole 70, respectively. First hole 60, located through first pole 30, is generally the shape of a screw or other connection piece and slightly larger than the diameter of the screw or other connection piece in order to allow for a screw or connection piece to slide therethrough. Second hole 70, located through second pole 40, may be an elongated hole or slot having any length larger than a screw and shorter than the length of second pole 40. When second hole 70 is aligned with first hole 40 the holes may receive screw 102 of lock mechanism 100, as shown in FIGS. 4-7.

As seen in FIGS. 4-7, lock mechanism 100 may comprise of many elements including screw 102, lever 104, spring mechanism 106, footer 108, lever holder 110, lever mat 112 and flat washer 114. Footer 108 may be any three-dimensional shape or size and preferably has at least a rounded portion for contacting second inner circumference 44 and where a second pole contact area 120 of footer 108 is wider than a width of the elongated second hole 70, as seen in FIG. 6. For example, footer 108 may have a general cross-sectional, two-dimensional shape of a circle or crescent or a rectangle with one edge or side arced. Footer 108 may be of varying lengths so as to impart a desired friction force or to spread such force over a desired area. Further, footer 108 may be made of any material that is preferably light, strong and durable; for example, aluminum, metal alloy, polymer or other material having such characteristics. In resting operation, contact area 120 of footer 108 abuts inner surface 44 as generally shown in FIG. 5 and FIG. 6.

As mentioned above, screw 102 may slidably engage holes 60, 70 in first pole 30 and second pole 40. Screw 102 may further slidably engage lever holder 110, lever mat 112 and spring mechanism 106 outside of first outer circumference 32. Lever holder 110, lever mat 112 and spring mechanism 106 may have holes that align with holes 60, 70 such that a central axis of screw 102 may be generally perpendicular to a central axis (or longitudinal axis, See arrow L, FIG. 5) of poles 30, 40. Further, screw 102 of locking mechanism 100 may rotationally and threadably engage footer 108, or engage footer 108 by any other known engaging method, at a position within second inner circumference 44. Alternatively, screw 102 may extend through footer 108 and secure to footer 108 with a nut or other fastener. Lever 104 may engage lever holder 110 via a lever connector 118. Lever connector 118 may be, for example, a rivet connector or a pin connector or any other type of connector allowing lever 104 to rotate about the axis of lever connector 118 and allowing lever 104 to contact a head of screw 102. Further, lever connector 118 may create a pivot at any vertical location between a top of lever mat 112 and a top of lever holder 110. Such location of the pivot, may allow for greater (or lesser) forces to be exerted by lever 104 on screw 102, than if the pivot were placed elsewhere.

Figure 7:
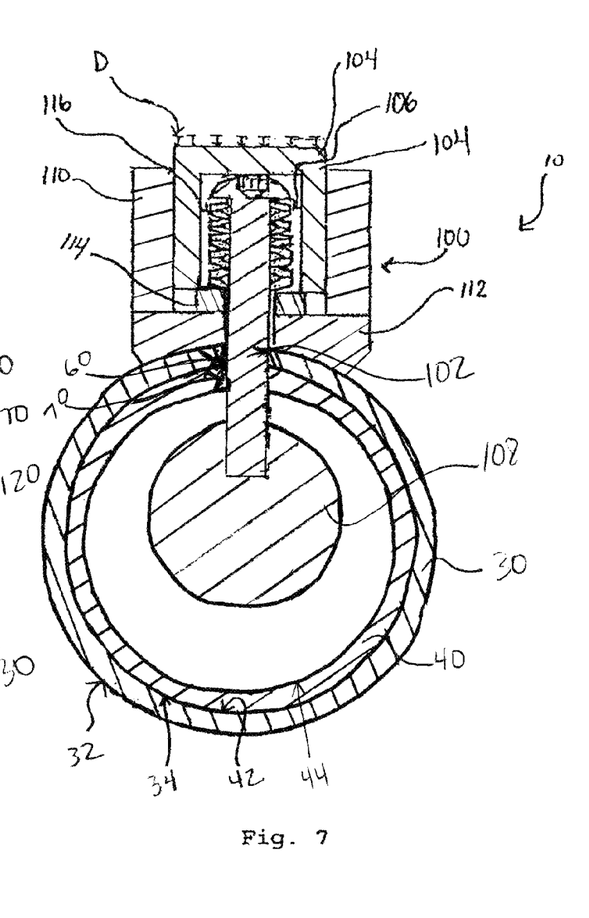
FIG. 7 is a cross-section of the embodiment taken across line 6-6 of FIG. 3 in depressed mode.

Spring mechanism 106 may be any spring-like object having a spring constant K. Spring mechanism 106 may be made of any material and may have any shape as long as it is capable of producing a friction lock between first pole 30 and second pole 40 while spring mechanism is in a natural (i.e., resting) position. The friction lock may be able to withstand forces placed upon quick release support 10 at upper support 20 and lower support 50 due to gravity and the mass of objects to be in contact with supports 20, 50. An example of an acceptable spring mechanism 106 is a Belleville washer 116 combination, as shown in FIGS. 5-7. It is understood that Belleville washers 116 may be used to create a spring having a spring constant K, which is dependent upon the number of Belleville washers 116 and the arrangement of each washer with respect to each other washer. The spring constant K may be modified by selecting different washer configurations, for instance washers may be stacked back-to-back or front-to-front, or nested together in various numbers and combinations, or washers having different curvatures and strengths may be selected, all to provide a desired force or spring constant.

When lever 104 is in a natural (i.e., resting) position, as in FIG. 6, spring mechanism 106 acts against screw 102 in a direction away from a central axis of poles 30, 40. This force (i.e., a first force, shown in the direction of arrow F in FIG. 6) of the springs results in screw 102 forcing footer 108 against second inner circumference 44. The spring mechanism exerts the first force on the footer in a direction exterior to the first pole, i.e., the direction of arrow F. The resulting force from footer 108 against second inner circumference 44 and flat washer 114 against first outer circumference 32 (and/or against lever mat 112, i.e., a second force opposite said first force direction F) creates a friction lock between first pole 30 and second pole 40. As discussed above, the friction lock may be capable of supporting mass (or forces) applied to the ends of support pole 10 without first pole 30 and second pole 40 inadvertently moving (sliding) with respect to one another.

When lever 104 is in a depressed position, as in FIG. 7, a user via the lever 104 exerts a force against screw 102. When a required amount of force is exerted by lever 104 against screw 102, the head of screw 102 acts on spring mechanism 106 and compresses spring mechanism 106 causing footer 108 to release tension from second inner circumference 44 (i.e., a third force, as exerted by footer 108 against second inner circumference 44, is less than the first force). The releasing of footer 108 from second inner circumference 44 may create a gap between footer 108 and second inner circumference as seen in FIG. 7, thus allowing the second pole to slide with respect to the first pole. It may also be appreciated that lessening of tension between footer 108 and inner circumference 44 may cause footer 108 to simply loosen, allowing second pole 40 to slide within first pole 30. A user may control the tension to allow the poles to slide freely or to loosen slowly. Dotted line D in FIG. 7 depicts the depression of the top of lever when a user force is applied thereto.

When footer 108 is released or the tension lessened from second inner circumference 44, as in FIG. 7, the friction lock between first inner circumference 34 and second outer circumference 42 is released and second pole 40 is able to slide generally freely, or in the direction of gravity, longitudinally along an axis of first pole 30. At any time while or after or before adjusting a length of quick-release support pole 10, a user may release lever 104, allowing spring mechanism 106 to return to its natural (i.e., resting) position, which will return screw 102 and lever 104 to their respective natural (i.e., resting or locked) positions. Such release of lever 104 may also friction lock first pole 30 and second pole 40 in place with respect to one another as footer 108 will once again compress second inner circumference 44. It may be appreciated that the forces caused by lock mechanism 100 in a resting position are applied generally perpendicular to the forces applied to the telescoping poles 30, 40 when in a supporting mode, thus a relatively low force applied via locking mechanism 100 can prevent the telescoping action.

Quick release support pole 10 may have a further adjustment connected to first end 46 of second pole 40 for fine tuning support of an object supported at upper support 20. Such a further adjustment may be rotationally, threadably connected at first end 46 of second pole 40 or the adjustment may be connected to first end 46 by any other connection mechanism allowing for fine tuning of a support spanning between two objects.

Quick-release support pole 10 may be used in a multitude of methods in a variety of support disciplines. For example, one such method may include supporting dry-wall to be used as a ceiling. In one hand a user may be grasping support pole 10 and lever 104. With another hand, the user may be supporting a piece of dry wall above his or her head. Of course, other individuals or support poles 10 may be utilized to further help support the dry wall while lifting the dry wall in place to be supported by support pole 10 and connected to a ceiling frame.

Once the dry wall piece is at its desired location (typically pressed against ceiling studs or sheets) the user may place upper support 20 in contact with the dry wall piece (or may use upper support 20 to assist in balance of drywall when lifting it into position). The user may exert a squeeze force (for instance, squeeze lever 104 by hand) on lever 104 toward a central axis of support pole 10, which may release (or loosen) the friction lock between first pole 30 and second pole 40. As a result of releasing the friction lock and gravitational forces, second pole 40 will telescope out of first pole 30 until its lower support 50 contacts a ground (or lower) surface, such as a floor. Thus, a user may continue to hold drywall, for instance, with one hand on pole 10 with the other hand supporting the drywall, while simultaneously releasing pole 40 to engage with a bottom surface, such as the ground. After adjusting the length of support pole 10 to its desired length (i.e., upper support is in contact with the dry wall and lower support 50 is contacting the ground surface), the user may release the lever 104 causing footer 108 to engage or tighten second pole 40 and once again cause a friction lock between first pole 30 and second pole 40. If the user needs to further adjust support 10 to account for a better angle of support (i.e., to align pole 10 generally vertically) or adjust after other support poles 10 have been placed or for another reason, the user can repeat the process by squeezing lever 104, make any quick or final adjustments, and then release lever 104.

A user may also elect to grasp pole 10 by grasping lever 104 while raising a piece of drywall. As the drywall is raised, pole 40 slides from pole 30. Simply releasing the grip of lever 104 automatically secures pole 10 in an extended position, which allows a user free use of both hands. Positioning adjustments of pole 10 with respect to the drywall and floor may then be made as desired by re-engaging lever 104 while exerting a lifting force at pole 30. Multiple poles 10 may be used for a given project to accommodate efficient overhead holding of material. While pole 10 may also be used in a generally horizontal application, a vertical orientation works best in order to take advantage of the automatic gravitational release of pole 40 when grasping lever 104.

The method(s) described above are meant to be examples of inventive methods of utilizing the inventive support pole and one skilled in the art will recognize there are other inventive methods of use within the spirit of the invention.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular SUPPORT DEVICE AND METHOD OF USE as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. An adjustable support apparatus, comprising:
   a first pole having an interior and an exterior;
   a second pole having an interior and an exterior and said second pole at least partially engaging said interior of said first pole;

a footer within said interior of said second pole; and a spring mechanism at said exterior of said first pole and said spring mechanism exerting a first force on said footer in a direction exterior to said first pole causing said footer to engage said second pole.

2. The apparatus of claim 1, further comprising:
said spring mechanism comprises a set of Belleville washers.

3. The apparatus of claim 1, further comprising:
said first pole having a circular hole; and
said second pole having an elongated hole.

4. The apparatus of claim 3, further comprising:
where said footer has a second pole contact area wider than a width of said elongated hole.

5. The apparatus of claim 1, further comprising:
where said spring mechanism exerts a second force, said second force exerted against said exterior of said first pole, said second force opposite said first force, and said first and second forces lock said first pole in a position with respect to said second pole.

6. The apparatus of claim 1, further comprising:
a lever;
a connector having a first end in communication with said lever and a second end connected to said footer.

7. The apparatus of claim 6, further comprising:
a second force is exerted on said first pole by said spring mechanism, said second force opposite said first force, and
where said lever is in a compressed position, a third force exerted by said footer is less than said second force.

8. The apparatus of claim 7, further comprising:
where said lever is in a compressed position, said lever is compressed toward a central axis of said first pole.

9. The apparatus of claim 6, further comprising:
where said connector extends through said spring mechanism and through said first pole and said second pole.

10. The apparatus of claim 9, further comprising:
a lever holder rigidly attached to said first pole;
said lever rotationally attached to said lever holder; and
said connector extending through said lever holder.

11. The apparatus of claim 1 where said first force exerts generally perpendicular to a longitudinal axis of said first pole.

12. A locking mechanism apparatus comprising:
a first pole and a second pole located inside said first pole;
a lever and a spring located outside said first pole;
a connector at least partially located outside said first pole and connected to a footer located inside said second pole; and
where said lever acts on said footer via said spring and said connector.

13. The apparatus of claim 12, further comprising:
where in a first position of said spring, said spring forces said footer toward said lever, and in a second position of said spring, said lever acting on said spring forces said footer away from said spring.

14. The apparatus of claim 13, further comprising:
where in said first position, said spring creates a friction lock between said first pole and said second pole.

15. A method of using a support pole equipped with a spring positioned at an exterior of the pole, said method comprising:
compressing the spring toward a central axis of the support pole, thereby reducing a force exerted by a footer on an inside surface of the support pole; and
adjusting a length of the pole.

16. The method of claim 15, further comprising:
contacting an upper support of the support pole with an object to be supported before said compressing step; and
contacting a lower support of the support with a lower surface after releasing the spring.

17. The method of claim 15 further comprising contacting the support pole to a floor surface prior to said compressing a spring.

18. The method of claim 15 further comprising compressing a lever toward the central axis of the support pole to compress the spring, and automatically adjusting a length of the pole to contact an object to be supported.

19. The method of claim 18 where automatically adjusting a length of the pole occurs while raising the object.

20. The method of claim 18 further comprising contacting a lower support of the support with a ground surface.

21. An adjustable support apparatus comprising:
a first pole telescopingly receiving a second pole; and
a quick-release locking mechanism, said locking mechanism including:
a spring positioned external said first pole,
a connector in communication with said spring and extending through a hole of said first pole and through an elongated slot of said second pole, and
a lever connected to said connector;
said locking mechanism applying a force to adjustably lock said second pole within said first pole such that said second pole is prohibited from sliding within said first pole, and such that said second pole slides within said first pole when said lever is compressed.

22. The apparatus of claim 21 where said locking mechanism further includes a footer positioned within said second pole and connected to said connector.

23. The apparatus of claim 21 where said second pole slides within said first pole such that said elongated slot extends from said first pole, and said second pole locks within said first pole, when said lever is released, at any position where said elongated slot extends from said first pole.

24. The apparatus of claim 23 where said elongated slot extends from said first pole a distance such that said slot is visible.

* * * * *